United States Patent [19]
Sankaran et al.

[11] Patent Number: 6,082,659
[45] Date of Patent: Jul. 4, 2000

[54] HIGH SPEED TRANSFER OF STRIP IN A CONTINUOUS STRIP PROCESSING APPLICATION

[75] Inventors: Subbiah Sankaran, San Ramon, Calif.; Daniel P. Ranly, Minster, Ohio

[73] Assignee: Kaiser Aluminum & Chemical Corp., Pleasanton, Calif.

[21] Appl. No.: 09/114,470

[22] Filed: Jul. 13, 1998

Related U.S. Application Data

[60] Provisional application No. 60/052,919, Jul. 15, 1997.

[51] Int. Cl.⁷ .................................................. B65H 35/04
[52] U.S. Cl. ........................................ 242/527.2; 242/532
[58] Field of Search ............................ 242/527.2, 527.3, 242/532, 533.4

[56] References Cited

U.S. PATENT DOCUMENTS

| | | |
|---|---|---|
| 2,973,158 | 2/1961 | Zernov . |
| 3,799,468 | 3/1974 | Caple et al. ........................ 242/527.6 |
| 3,805,570 | 4/1974 | Smith . |
| 4,019,359 | 4/1977 | Smith . |
| 4,116,394 | 9/1978 | Smith et al. . |
| 4,326,680 | 4/1982 | Tetro et al. .............................. 242/526 |
| 4,339,092 | 7/1982 | Benoy et al. ........................... 242/532 |
| 4,431,140 | 2/1984 | Tetro . |
| 4,458,852 | 7/1984 | Calvert et al. . |
| 4,485,979 | 12/1984 | Dropczynski ........................ 242/527.3 |
| 4,515,321 | 5/1985 | Kahlman .............................. 242/527.3 |
| 4,516,735 | 5/1985 | Snygg ................................... 242/527.3 |
| 4,541,583 | 9/1985 | Forman et al. ...................... 242/527.3 |
| 4,723,724 | 2/1988 | Bradley ..................................... 242/521 |
| 4,852,820 | 8/1989 | Looser ................................. 242/527.2 |
| 4,856,725 | 8/1989 | Bradley ............................... 242/533.2 |
| 4,920,842 | 5/1990 | Orlicki et al. ............................. 83/308 |
| 4,962,897 | 10/1990 | Bradley ..................................... 242/521 |
| 4,993,652 | 2/1991 | Moeller ................................ 242/527.3 |
| 5,086,986 | 2/1992 | Twente ................................. 242/527.2 |
| 5,106,028 | 4/1992 | Schenk et al. . |
| 5,251,836 | 10/1993 | Pack . |
| 5,301,890 | 4/1994 | Schnell . |
| 5,356,495 | 10/1994 | Wyatt-Mair et al. . |
| 5,383,622 | 1/1995 | Kohler ................................. 242/527.2 |
| 5,421,536 | 6/1995 | Hertel et al. ......................... 242/526.1 |
| 5,470,405 | 11/1995 | Wyatt-Mair et al. . |
| 5,496,423 | 3/1996 | Wyatt-Mair et al. . |
| 5,514,228 | 5/1996 | Wyatt-Mair et al. . |
| 5,515,908 | 5/1996 | Harrington . |
| 5,520,352 | 5/1996 | Prix et al. ............................ 242/527.3 |
| 5,564,491 | 10/1996 | Harrington . |
| 5,653,399 | 8/1997 | Koutonen et al. ................... 242/527.3 |
| 5,660,349 | 8/1997 | Miller et al. ......................... 242/526.1 |
| 5,695,149 | 12/1997 | Schulze et al. ...................... 242/533.4 |
| 5,725,176 | 3/1998 | Vigneau ............................... 242/527.3 |
| 5,735,481 | 4/1998 | Loosen ................................. 242/526.1 |
| 5,775,628 | 7/1998 | Rabe et al. ........................... 242/533.4 |
| 5,813,623 | 9/1998 | Hutzenlaub et al. ................ 242/533.4 |
| 5,845,867 | 12/1998 | Hould et al. ......................... 242/527.2 |
| 5,848,761 | 12/1998 | Reinhold ............................. 242/533.4 |

FOREIGN PATENT DOCUMENTS

| | | |
|---|---|---|
| 30 33 765 A1 | 10/1981 | Germany ............................. 242/527.2 |
| 36 29 216 | 3/1988 | Germany . |
| 44 19 377 | 11/1995 | Germany . |
| 1-157713 | 6/1989 | Japan . |
| 2-217113 | 8/1990 | Japan . |
| 5-301662 | 11/1993 | Japan .................................. 242/527.3 |

*Primary Examiner*—Donald P. Walsh
*Assistant Examiner*—Emmanuel M. Marcelo
*Attorney, Agent, or Firm*—Rockey, Milnamow & Katz, Ltd.

[57] ABSTRACT

Apparatus and a process for the high-speed coiling of an aluminum strip. The high speed coiling can be accomplished throughout a continuous casting process without slowing the coiling as the present invention enables the transfer of the moving strip from one coil to an empty mandrel without slowing the line speed. Since line speeds can be approximately 3600 feet per minute, this represents an advance in process technology. Generally, the transfer of the moving strip is accomplished using a very high speed knife, and a belt wrapper. The moving strip is accumulated on one mandrel to form a coil, the coil is moved away from the knife and a second mandrel is brought into position. The knife is positioned at the moving aluminum strip and accelerated to cut the strip and deflect it to a tucking roll with a moving belt. The moving strip is forced around the second mandrel and starts to wind to form a coil. The completed coil is removed and the process is repeated.

28 Claims, 3 Drawing Sheets

HIGH SPEED TRANSFER OF STRIP IN A CONTINUOUS STRIP PROCESSING APPLICATION

This application is a continuation-in-part of provisional application Ser. No. 60/052,919, filed Jul. 15, 1997, which is hereby incorporated by reference in its entirety.

FIELD OF INVENTION

The present invention is in the field of in-line metal processing. More specifically, the present invention is an apparatus and a process for transferring a metal strip from one coil to a second coil during high speed continuous operation.

BACKGROUND OF THE INVENTION

This invention relates to the processing of light gauge non-ferrous and ferrous material in continuous strip processing lines. Typically, the process section of the line runs in a continuous, uninterrupted mode. To provide this continuous operation, the prior art uses equipment that accumulates (called loopers or accumulators) flat rolled metal from the process section during the time it takes to slow down, part the strip and divert it from the first coiler to a second coiler. In some processing lines, only one coiler is installed and therefore the accumulator or looping system has to have adequate storage to allow for removal of the finished coil while the system is readied for the new coil to start winding. An alternative method is to slow the process section so that the transfer can be made at slow speeds with conventional transfer mechanisms that can operate at these speeds.

The purpose of the present invention, termed a dual coiler, is to permit the transfer of metal strip from one mandrel to another at high line speeds. This advantage eliminates the need for elaborate accumulating equipment and allows the process section to operate at optimum speeds without degrading the quality of the product while maintaining the production capabilities of the line.

SUMMARY

The present invention is an apparatus that is capable of coiling and transferring a metal strip when the strip is moving at speeds greater than 1,200 feet per minute (fpm). Preferably, the strip can be transferred at speeds greater than 2,000, 2,500, 3,000, or even 3,600 fpm. Preferably, the apparatus comprises a first and second mandrel, the mandrels are capable of winding a moving metal strip into a coil, a knife capable of being positioned proximate to the moving metal strip and capable of cutting the strip while the strip is moving and being coiled onto the first mandrel, a means to deflect and wrap the moving metal strip around the second mandrel. The presently preferred process for coiling a moving metal strip, comprises moving a metal strip at a speed greater than 1,200 fpm; coiling the strip around a mandrel; cutting the strip while substantially simultaneously deflecting it to a second mandrel where it is wrapped and coiled around the second mandrel. Preferably, the metal is aluminum.

Among other factors, the present invention is the surprising discovery that a moving metal strip, such as an aluminum strip, can be transferred from one coil to another while the strip is running at very high speeds. This process and apparatus allows in-line processing without slowing or shutting down a continuous operation or the introduction of large accumulators, which would be required if the line speed was as high as intended. The presently preferred invention achieves the above advantages by using a high speed, pivoting knife to sever the rapidly moving strip. Thereafter, the knife and at least one ironing roll, with the belt wrapper, transfer the strip to a second mandrel.

More specifically, the present apparatus for high speed coiling and transfer of an aluminum strip comprises a first and second mandrel mounted on a movable, common frame, the mandrels are capable of storing a moving aluminum strip, the first mandrel is engaged in winding the aluminum strip, whereas the second mandrel is substantially empty, but is designed to begin winding the moving strip once it is transferred from the first mandrel. Additionally, the invention preferably includes a high speed impact air cylinder, pivoting, single blade knife capable of traveling above 40 Feet per second (fps) and capable of being positioned within one inch from the moving aluminum strip, the knife is capable of cutting the strip while the strip is moving at speeds of up to about 3,600 fpm and is designed to assist in deflecting the moving aluminum strip to the second mandrel in cooperation with a belt wrapper. The belt wrapper is positioned proximate to the knife and the second mandrel so that it is capable of wrapping the moving aluminum strip around the second mandrel after being cut by the knife, the belt wrapper comprises a tucking roll which uses the moving belt to capture the leading edge of the moving strip.

The present process more specifically comprises winding a moving metal strip onto a first mandrel, positioning a second mandrel proximate to a knife and a belt wrapper, the belt wrapper having a tucking roll on the moving belt closely located to the knife to capture the leading edge of the moving strip, positioning the knife to within one inch of the moving strip, positioning the belt wrapper around the second mandrel to wrap the strip around the second mandrel after being cut by the knife, cutting the moving strip with the knife and substantially simultaneously deflecting the strip to the belt wrapper and the second mandrel, the strip is traveling at a speed greater than 1,200 fpm; and wrapping and winding the moving strip around the second mandrel.

DETAILED DESCRIPTION OF THE INVENTION

Figure 1:
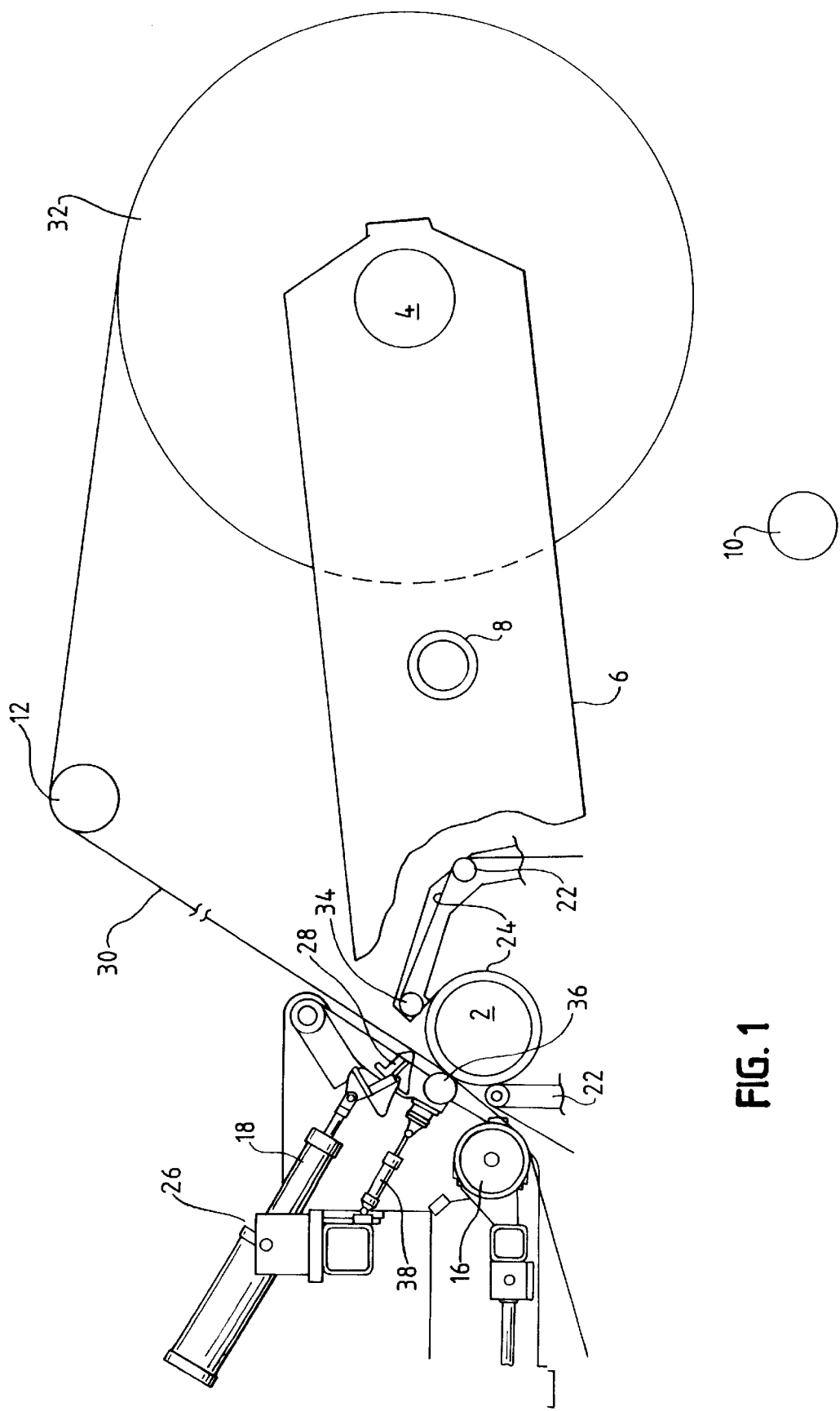
FIG. 1 shows a view of the preferred invention in the pre-cut/cut configuration.

The present invention is a process and an apparatus to switch a moving metal strip from one coil to another in a high speed continuous casting process. A preferred embodiment of the invention employs aluminum as the metal strip and is as follows.

"Coil" refers to a wound cylinder of a metal strip. The metal strip is preferably aluminum. However, it can also include other metals, such as steel, copper, or other metals that are formed into strips. The following preferred dimensions are provided as typical for aluminum strip. The preferred moving aluminum strip is typically between 0.006 and 0.030 inches in thickness, more preferably between 0.008 and 0.012 inches in thickness. Preferably, the strip is at least 6 inches wide, more preferably, at least 12 or 14 inches wide. Preferably, the strip is no more than 80 inches wide. The coil size can preferably be 96 inches in diameter, or as dictated by the customer's requirements for finished coils. "Mandrel" is defined as a cylindrical sleeve, hub, or tube around which the strip is wound to create a coil. The mandrels can be 16", 20" or 24" diameter, or as dictated by the customer's requirements. They can be the expanding type, with rotating cylinder, double stub or overhung type. Mandrel diameters and coil widths can be suitable for any strip processing application. Preferably, each mandrel is individually driven by variable speed A.C. or D.C. motors. The mandrels are operated by independent gearing. For example, one mandrel can operate at a speed and a direction that is different than the other. This flexibility enables the dual coiler to serve as an additional, offline coiler, thereby obviating the need to for extra equipment if it is necessary to recoil a previously wound strip. "Coiler" is defined as any apparatus that winds the moving aluminum strip on a mandrel for storage. A preferred example of a coiler used in the present invention is a Ferris wheel type at the end of a continuous casting and rolling line. Preferably, it must be able to coil the moving aluminum strip at a high speed. The definition of a high speed is not an absolute number, however, it is generally at least 1200 or 2,000 feet per minute (fpm), but can be higher. Preferably, it must operate at speeds of up to around 2,500 or 3,600 fpm. Additionally, it must transfer coil-to-coil at speeds of at least 1,200 fpm with a strip gauge of 0.030" and a typical maximum higher end transfer speed coil-to-coil around 3600 fpm with a strip gauge less than 0.008". It is preferable to transfer coil-to-coil at speeds of at least 2,000 or 2,500 fpm, more preferably at 3,000 or 3,600 fpm. "Belt wrapper" is defined as any device that is capable of assisting in the deflection of the sheared, moving strip onto the empty mandrel. Preferably, the belt wrapper has a tucking roll which is closely located to the knife and encircles the empty mandrel with the moving belt of the belt wrapper to assist in this deflection. The belt wrapper is preferably the overwind type, articulated and pivoting type. Preferably, it embodies a belt tracking system capable of running as high as 4000 fpm with constant belt tension under all conditions. The tucking rolls are designed to be placed at the leading edge of the belt wrapper and spaced at the minimum distance from the shear point. The belt wrapper is positioned and designed to wrap the moving aluminum strip around the mandrel after it has been sheared and deflected onto the mandrel. After a period of time in which the strip has been started on the mandrel, the belt wrapper can be moved out of position.

"Knife" is defined as one or more devices that can cut a moving aluminum strip. As an example, these devices can be: mechanical, such as a sharpened cutting edge or blade; hydraulic, such as a water or air jet; a laser; or a flame cutter. There are many types of commonly available knives, however, the preferred knife is a pivoting single-blade, specially contoured knife, operated by a high-speed impact air cylinder, capable of traveling above 40 feet per second. Faster knife speeds should be employed in the event heavier gauges of aluminum are used, or metals that are more difficult to sever. Preferably, it is located extremely close to the strip and the belt nip tension point on the mandrel, more preferably, it is positioned within an inch or two from the moving aluminum strip. In the most preferred embodiment, the knife has a serrated edge with teeth, in which the teeth are approximately 0.5 inches long and approximately 0.25 inches between the teeth.

The aluminum strip can be produced in a variety of different ways. For example, the strip may be produced according to the methods shown in any of the following United States patents, which are all incorporated by reference in their entireties: U.S. Pat. Nos. 5,470,405; 5,514,228; 5,515,908; 5,564,491, 5,496,423; and 5,356,495. The aluminum strip can be coiled and stored in an uncoated state. However, the present invention contemplates obtaining strip directly from an in-line process, such as any of the processes described in the United States patents referred to above. The moving strip can also be obtained from a process line that starts with a coil. Equipment for coiling and treating a strip is known in the art and it includes the following types: coil leveling lines, coil annealing lines, coil organic coating lines, and coil metallic coating lines.

In the presently preferred strip casting process, molten metal, preferably aluminum, is formed into a strip by a twin belt caster as described in the U.S. Patents incorporated by reference above. Thereafter, the cast strip is passed through various pieces of equipment and several rolling stands to reduce it to the appropriate gauge.

At this point, the strip can be traveling at an elevated line speed, measured in feet per minute (fpm). Typical line speeds in the present invention can be greater than 1,200 as stated above. The strip must be coiled at this speed and, as mentioned above, it will ultimately need to be transferred to an empty mandrel once the first coil is full. This is where the prior art requires that the line speed be slowed or that accumulators are necessary while the strip is cut and diverted to a second coil or mandrel. The present invention achieves that transfer without an interruption in operation or a significant decrease in line speed.

A preferred configuration and operation of the present dual coiler invention is shown in FIG. 1 and is described as follows. The metal strip is wound initially onto mandrel 4, with mandrel 2 being empty and awaiting transfer of the strip. These two mandrels are mounted on a common frame 6, which is pivot mounted at location 8. A common frame is not required, just preferred. Any combination of devices is acceptable that can move the coil out of the way, and put the empty mandrel into position.

Preferably, the mandrels are mounted on a moveable frame. This frame preferably pivots from a centerline which enables the following. The mandrel that is winding the strip can be moved out of the way to substitute the empty mandrel. The coiler pivot frame has driven deflector rolls to maintain a fixed pass line at the pivot shear for a minimum transfer distance for the leading end of the strip at the time of transfer. Pivoting hold-down rolls (one on top and one on the bottom of the coil) are to be provided for containment of the tail of the finished coil after the strip has been sheared and transferred to the empty mandrel.

Preferably, the two rolls 10 and 12 are also mounted on the common frame 6. These rolls will assist in transferring the moving strip to the coil while enabling the coil to be rotated to a different position, such as shown in FIG. 1. This figure shows a full coil which is wound on to mandrel 4, but no strip is present on mandrel 2. The moving strip is diverted around rolls 16 and 12, and wound on to mandrel 4. This is the 'just prior to transfer' condition of the coil 32, strip 30, and mandrels 2 and 4.

Figure 2:
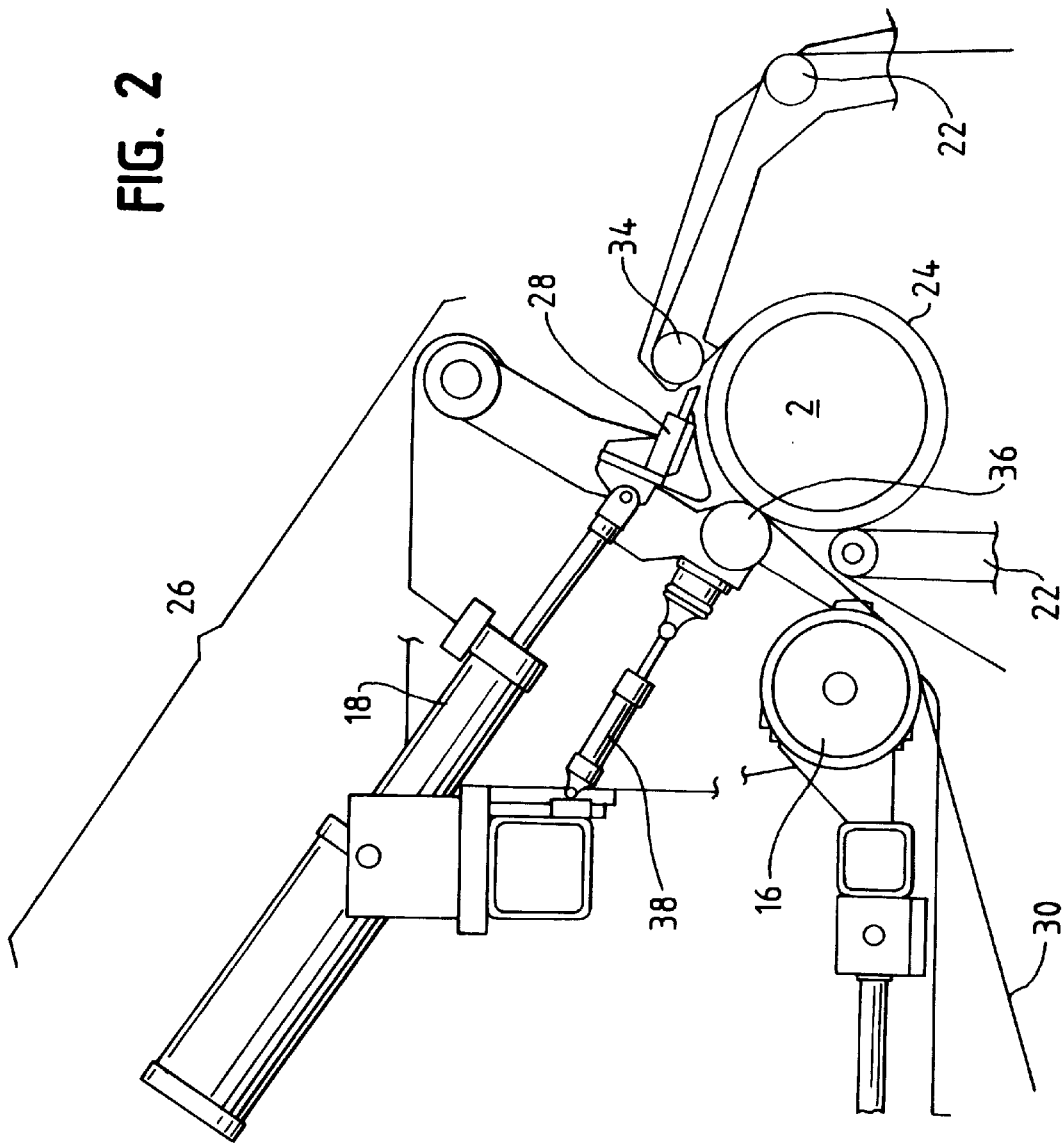
FIG. 2 shows a view of the preferred invention in the post-cut configuration.
Figure 3:
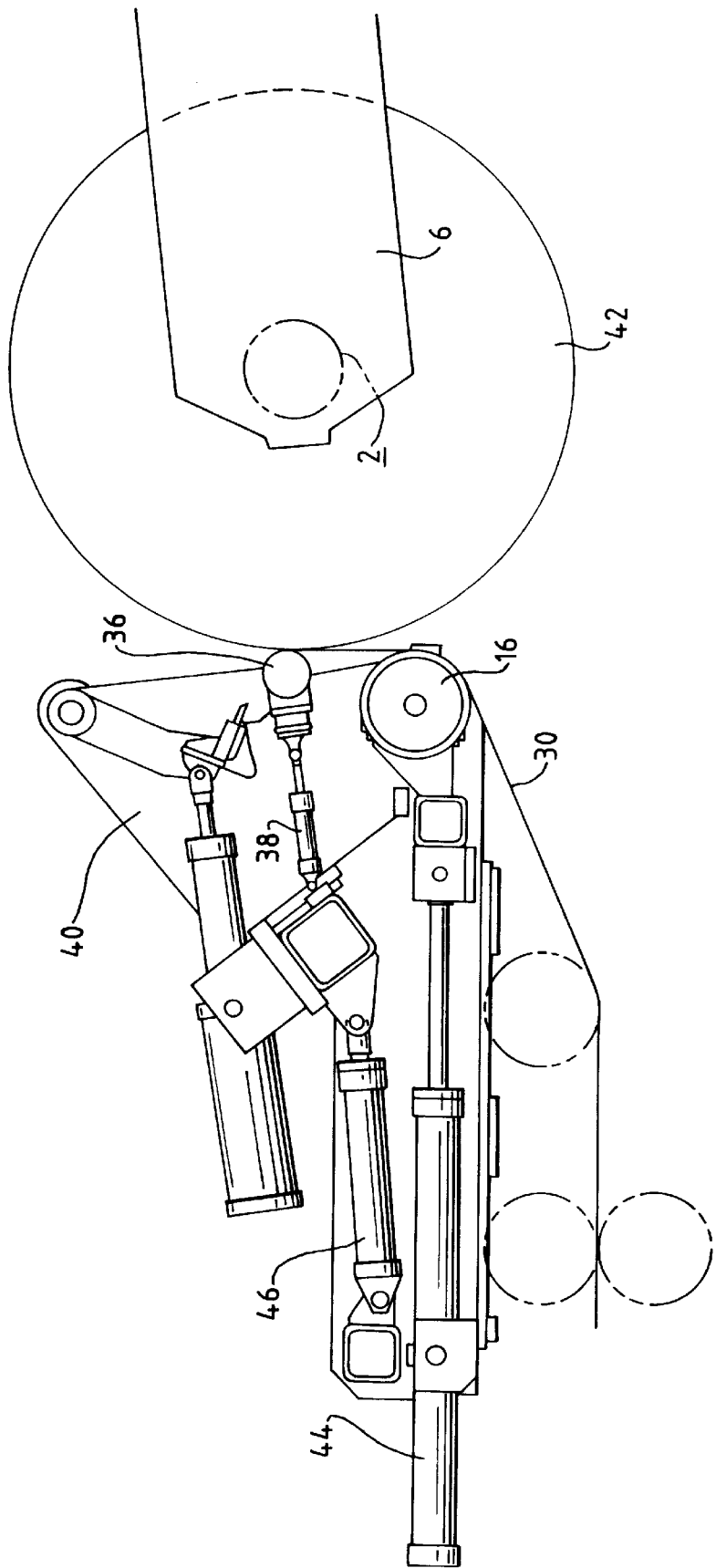
FIG. 3 shows a view of the preferred invention in the line run configuration.

FIG. 1 also shows a partial view of a belt wrapper 22 in position around mandrel 2. This device is common to the strip processing industry. The belt 24 is continuous, passing around additional rolls not shown. FIGS. 2 and 3 show the 'post cut' and 'line run' positions of an impact air cylinder 18 operated pivoting knife assembly 26. The use of a belt wrapper 22 in conjunction with this unique pivoting knife 26 described below, makes this invention different from other transfer devices that are limited to slower speeds. This combination provides a special geometrical relationship that permits the severed strip to quickly change direction and start winding around the substantially empty second mandrel 2. The pivoting knife assembly 26 has a specially contoured knife 28 and is preferably operated by an ultra high speed impact air cylinder 18. (It is important that the knife operate at a speed sufficient that it sever the strip without negatively impacting its movement to the second mandrel.) The pivoting knife assembly 26 is capable of parting the strip without the use of a secondary shear blade, which is conventionally required by most shears used for this purpose. This configuration allows the knife 28 to be positioned such that the travel to cut the strip 30 from the coil 32 at mandrel 2 is very small. For example, it is preferred if the knife is up to one or up to two inches from the strip. Preferably, this specially contoured knife has a serrated edge and is contoured in three dimensions. It has multiple pointed teeth and has a single bevel in two dimensions towards the center point. The preferred dimensions are approximately 0.25 inches between teeth and each tooth is approximately 0.5 inches long. The tooth has approximately a 60° rake. The blade is made from a 0.50 inch bar and is at least as wide as the material to be cut. The dimensions of the knife can be modified to fit various uses. However, one main design goal is to minimize the length of time that the teeth engage the moving strip. The longer the engagement time, the less likely it is that the cutting operation will go smoothly.

The blade can be retracted into its housing prior to cutting the strip as shown in FIG. 1. During cutting, the blade is extended to engage the strip and sever it as shown in FIG. 2. The housing is designed to facilitate the pushing of the moving aluminum strip to the belt wrapper and mandrel.

Furthermore, a belt wrapper tucking roll 34 is positioned extremely close to the cut strip to capture the leading end of the strip into the pinch point of the moving belt 24 driven by contact with mandrel 2. The preferred distance is within one or two inches from the strip. Roll 36, operated by an air cylinder 38, acts as an ironing roll immediately after the knife 28 has severed the strip 30 from the coil on mandrel 4 to effectively complete the wrapping of the strip to mandrel 4. The tail end of the coil on mandrel 4 leaves roll 12 as the coil 32 is decelerated to a stop. Additional rolls and wrappers that are not shown, help in containing the tail to finish wrapping the coil on mandrel 4.

It should be understood that the moving aluminum strip is cut, then deflected onto the empty mandrel 2. Many means to divert the strip can be used, such as rolls, deflector plates, belts, etc. These devices simply need to physically deflect the rapidly moving strip from its original line of travel to the new mandrel. In the presently preferred invention, an interaction between the knife 28 and its assembly (including roll 36) serves to deflect the strip onto the empty mandrel 2 as described. A suitable deflecting device will operate at sufficient speeds to be compatible with the other equipment and to deflect the strip into the equipment for winding the strip.

Once cut, the belt wrapper 22 may assist in capturing the moving strip. Other devices may be used to capture the moving strip and to direct it to wind onto the new mandrel. These devices include driven blocker rolls, plates, etc. The presently preferred device is the belt as it ensures that the strip will encircle the mandrel.

Once the cut is complete as shown in FIG. 2, the cylinder 18 is de-energized to retract the knife 28 from the mandrel 2. Tension is applied to mandrel 2, and after a few wraps to ensure that the strip is connected to the mandrel, the jaws of the belt wrapper 22 are opened up and the belt wrapper 22 is retracted.

FIG. 3 shows the 'line run' condition. The pivoting knife frame 40 and roll 36 are further retracted by cylinder 46. The coiler frame 6 is rotated slightly clockwise to the position shown. Roll 36 can be left in position to iron the wraps, removing entrapped air between the wraps throughout the coil build-up. As the coil 42 gets larger on mandrel 2, the entire knife and roller assembly retracts by cylinder 44 to maintain the relationship between the strip 30, roll 16, roll 36 and the coil 42 on mandrel 2. During build-up of the coil 42 at mandrel 2, the completed coil 30 at mandrel 4 is removed by conventional methods. Coiler frame 6 is ready for rotation once the coil 30 is removed and the coil accumulates on mandrel 2.

When the coil 42 on mandrel 2 has reached the desired size, the knife 40 and roller assembly 16 is retracted by cylinder 44 and the coiler frame 6, including mandrels 2 and 4 with rolls 10 and 12, are rotated clockwise to again position the empty mandrel to the (prior) location of mandrel 2 as originally shown in FIG. 1. The cycle is repeated for each coil change.

A new sleeve, as required by some customers, may be placed on the empty mandrel after removal of the coil. Preferably, an automatic arm is used to replace the sleeve. It is adapted to remove a sleeve from a gravity fed rack and then rotate and slide the sleeve onto the empty mandrel. Thereafter, the arm rotates out of the way and in place for the next operation. The mandrel may also be operated without sleeves.

As shown above, the dual coiler automatically transfers aluminum strip from an existing coil to a substantially empty mandrel. After transfer has been completed, the finished coil is removed and placed on a rack that can be used to store and transport the coil.

The components of the dual coiler described above are actuated and moved by appropriate hydraulic (liquid or air) or electrical means. For example, the apparatus to position the knife can be brought into place and retracted by the above means. Also included in this list of powered means is the automatic arm for sleeve replacement and the positioning means for the belt wrapper and mandrels, for example.

The sequence of all motions in a precise timed operation is best accomplished by a digital computer controls system using algorithms that incorporate all the geometric and speed relationships. However, other sequencing systems using timers, relays and conventional control hardware may also be used.

The following examples will further demonstrate the unique features of the present device and process. Those skilled in the art will appreciate that the present invention is being illustrated by way of example, and that no limitations on the claims should be made based on the preferences stated in the following.

EXAMPLE I

A specially designed testing apparatus was constructed to test the present dual coiler. In lieu of running the knife on a continuous, linear moving strip, we constructed a testing apparatus that used an endless, moving aluminum band. This apparatus was advantageous in that it avoided the accumulation of a coil. The apparatus simulated the conditions that occur during normal coiling operations. The conditions were similar to those described above for the preferred embodiment, such as a speed of 3,600 fpm and other conditions. The tests were successful in cutting and wrapping the aluminum strips around the new mandrel for each of the tests of the invention.

EXAMPLE II

The preferred device similar to that shown in FIGS. 1–3 was constructed and installed as the system for use with the in-line continuous casting operation substantially shown in the above referenced U.S. Patents. Many successful transfers of strip from coil to mandrel were performed at speeds as high as 2,500 fpm.

The present invention has been described with referenced to specific embodiments. However, the application is intended to cover those changes and substitutions which may be made by those skilled in the art without departing from the spirit and scope of the appended claims.

We claim:

1. An apparatus for high speed coiling a moving metal strip, comprising:
   first mandrel and second mandrel means, each mandrel means for winding a moving metal strip into a coil; and
   knife means having an operative position proximate to the moving metal strip, in which position the knife means to cut the strip while the strip is moving and being wound into a coil by the first mandrel means, the knife means deflecting the moving metal strip, after cutting the strip, so that the moving metal strip can then be wound into a coil by the second mandrel means.

2. An apparatus in accordance with claim 1 wherein the knife means comprises a high speed, single blade adapted for traveling at a speed above 40 fps into the operative position for cutting the moving strip.

3. An apparatus in accordance with claim 1, further comprising a belt wrapper which has an operative position proximate to the knife and the second mandrel means in which position the belt wrapper wraps the moving metal strip, after the strip has been deflected by the knife means, around the second mandrel means.

4. An apparatus in accordance with claim 1 wherein the metal is aluminum.

5. An apparatus in accordance with claim 1 wherein the knife has a serrated edge.

6. An apparatus in accordance with claim 5 wherein the knife has a serrated edge having teeth, in which the teeth are approximately 0.5 inches long and approximately 0.25 inches between the teeth.

7. An apparatus in accordance with claim 1 wherein the apparatus is adapted for coiling and transferring a metal strip when the strip is moving at speeds greater than 1,200 fpm.

8. An apparatus in accordance with claim 1 wherein the apparatus is adapted for coiling and transferring a metal strip when the strip is moving at speeds greater than 2,000 fpm.

9. An apparatus in accordance with claim 1 wherein the apparatus is adapted for coiling and transferring a metal strip when the strip is moving at speeds greater than 2,500 fpm.

10. An apparatus in accordance with claim 1 wherein the apparatus is adapted for coiling and transferring a metal strip when the strip is moving at speeds greater than 3,600 fpm.

11. A process for coiling a moving metal strip, comprising:
    moving a metal coil strip at a speed greater than 1,200 fpm;
    coiling the strip around a first mandrel; and
    cutting the strip with a knife and deflecting the strip with the knife, after cutting the strip to a second mandrel, around which the strip then is coiled.

12. A process in accordance with claim 11, wherein the speed is greater than 2,000 fpm.

13. A process in accordance with claim 11, wherein the speed is greater than 2,500 fpm.

14. A process in accordance with claim 11, wherein the speed is greater than 3,000 fpm.

15. A process in accordance with claim 11, wherein the speed is greater than 3,600 fpm.

16. A process in accordance with claim 11, wherein the metal is aluminum.

17. A process in accordance with claim 16, wherein the strip is moving at a speed greater than 2,000 fpm.

18. A process in accordance with claim 16, wherein the strip is moving at a speed greater than 2,500 fpm.

19. A process in accordance with claim 16, wherein the strip is moving at a speed greater than 3,000 fpm.

20. A process in accordance with claim 16, wherein the strip is moving at a speed greater than 3,600 fpm.

21. A process in accordance with claim 16, wherein the knife is positioned within two inches of the moving strip.

22. A process in accordance with claim 21, wherein the knife travels at a speed above 40 fps when cutting the strip.

23. A process in accordance with claim 11, wherein the strip is cut with a high speed knife.

24. A process in accordance with claim 23, wherein the knife is adapted for traveling at a speed above 40 fps.

25. A process for coiling a moving metal strip, comprising:
    winding a moving metal strip onto a first mandrel;
    moving a second mandrel to a position proximate to a belt wrapper and the moving strip;
    positioning a knife to a position proximate to the moving stripe;
    cutting the moving strip with the knife and deflecting the strip with the knife, after cutting the strip, to the belt wrapper and the second mandrel; and
    wrapping with the belt wrapper and winding the moving strip around the second mandrel.

26. A process in accordance with claim 25, wherein the metal is aluminum.

27. An apparatus for high speed coiling and transfer of an aluminum strip, comprising:
    first mandrel and second mandrel means, mounted on a movable, common frame for storing a moving aluminum strip, wherein the first mandrel means is engaged in winding the aluminum strip, whereas the second mandrel means is substantially empty, but begins winding the moving strip once the moving strip is transferred from the first mandrel means;
    a high speed impact air cylinder, pivoting, single blade knife means for traveling at a speed above 40 fps and for being positioned within one inch from the moving aluminum strip, the knife means for cutting the strip while the strip is moving at speeds of up to about 3,600 fpm and for deflecting the moving aluminum strip, after cutting the strip, to the second mandrel means;
    a belt wrapper positioned proximate to the knife means and the second mandrel means and for wrapping the moving aluminum strip around the second mandrel means, after cutting with the knife means the belt wrapper having a tucking roll carrying a moving belt to capture the leading edge of the moving strip, as deflected by the knife means.

28. A process for coiling a moving metal strip, comprising:
    winding a moving metal strip onto a first mandrel;
    positioning a second mandrel proximate to a knife and a belt wrapper, the belt wrapper having a tucking roll which carries a moving belt to capture the leading edge of the moving metal strip;

positioning the knife to within one inch of the moving strip;

positioning the belt wrapper around the second mandrel to wrap the strip around the second mandrel;

cutting the moving strip with the knife and deflecting the strip with the knife to the belt wrapper and the second mandrel, after cutting the strip, while the strip is moving at a speed greater than 1,200 fpm; and wrapping with the belt wrapper and winding the moving strip around the second mandrel.

* * * * *

UNITED STATES PATENT AND TRADEMARK OFFICE
CERTIFICATE OF CORRECTION

PATENT NO. : 6,082,659
DATED : July 4, 2000
INVENTOR(S) : Subbiah Sankaran

Page 1 of 1

It is certified that error appears in the above-identified patent and that said Letters Patent is hereby corrected as shown below:

Title page,
Delete the assignee, "Kaiser Aluminum & Chemical Corp., Pleasanton, Calif." and insert therefor --Alcoa Inc., 201 Isabella Street, Alcoa Corporate Center, Pittsburgh, Pennsylvania 15212-5858 --.

Column 7,
Line 21, delete " to cut" and insert therefor -- cuts --.

This change is necessitated by error on the part of the applicant.

Signed and Sealed this

Fourteenth Day of August, 2001

*Attest:*

NICHOLAS P. GODICI
*Attesting Officer*  *Acting Director of the United States Patent and Trademark Office*